United States Patent [19]

Skeaff et al.

[11] 4,374,096

[45] Feb. 15, 1983

[54] URANIUM ORE PROCESSING

[75] Inventors: James M. Skeaff; Gordon M. Ritcey; Kazi E. Haque, all of Ottawa; Bernard H. Lucas, Nepean, all of Canada

[73] Assignee: Canadian Patents & Development Limited, Ottawa, Canada

[21] Appl. No.: 62,801

[22] Filed: Aug. 1, 1979

[51] Int. Cl.³ .................. C01G 43/00; C01F 15/00; C01G 28/00; C01G 49/00

[52] U.S. Cl. .......................................... 423/9; 423/2; 423/8; 423/18; 423/88; 423/149

[58] Field of Search ................... 423/2, 9, 18, 8, 20, 423/88, 149

[56] References Cited

U.S. PATENT DOCUMENTS

| | | | |
|---|---|---|---|
| 2,990,244 | 6/1961 | Brown et al. | 423/18 |
| 3,159,452 | 12/1964 | Lerner | 423/18 |
| 3,835,213 | 9/1974 | Ritcey et al. | 423/9 |
| 3,880,980 | 4/1973 | Wamser | 423/18 |
| 3,937,783 | 2/1976 | Wamser et al. | 423/18 |
| 3,949,047 | 4/1976 | Cherdron et al. | 423/2 |
| 4,059,320 | 10/1977 | Learmont | 423/2 |
| 4,159,308 | 6/1979 | McLaughlin | 423/18 |

OTHER PUBLICATIONS

Merritt, "The Extractive Metallurgy of Uranium", pp. 59-79, Colorado School of Mines, (1971).
Coleman et al., "Proc. Intr. Cont. Peaceful Uses Atomic Energy", vol. 28, pp. 278-288, United Nations, (1948), Geneva.

Primary Examiner—Edward A. Miller
Attorney, Agent, or Firm—Alan A. Thomson

[57] ABSTRACT

Uranium ores, concentrates, calcines or tailings are processed to remove radium and thorium as well as uranium. Selected ores, concentrates or tailings, or if more appropriate, chlorination calcines thereof, are leached by selected aqueous chlorine-containing media (preferably in two stages) until uranium, radium and thorium are substantially all dissolved, with the insoluble residual solids being suitable for disposal. The leach solution is treated to recover sequentially uranium, usually thorium, and radium by selected techniques. The radium recovered can be disposed of in any environmentally-acceptable manner. The amount of iron in the residual leach liquor should be controlled to avoid iron build-up, with the barren leach solution being suitable for recycle.

17 Claims, 6 Drawing Figures

URANIUM ORE PROCESSING

This invention is directed to the separate recovery of uranium, thorium and radium from ores, concentrates, calcines or tailings containing them. Selected aqueous chlorine-containing leachant systems tailored to the type of feed material have been found, which, coupled with selected separation steps and in many cases initial chlorination roast steps, lead to high recoveries of uranium, thorium and radium. The solid residue is suitable for disposal and the isolated radium can be disposed of in any environmentally-acceptable manner.

BACKGROUND AND PRIOR ART

Concern over the acid drainage and radionuclide dissolution problems associated with current uranium tailings disposal methods, as well as the lack of fissionable thorium recovery, has prompted investigation into improved methods of isolating uranium and thorium from their ores while leaving solid tailings more suitable for disposal.

Present commercial uranium extraction in most mills usually involves leaching of the ore with sulfuric acid, ion exchange (or solvent extraction) separation of the uranyl sulphate complex from the leach liquor, and precipitation of the uranium most often as yellowcake (80–85% $U_3O_8$). Fresh tailings from such operations usually contain approximately 3% pyrite and 300 or more picocuries (Ra-226) per g, which is well above current or projected environmentally-acceptable amounts. Environmental problems associated with this practice include generation of $H_2SO_4$ within the tailings (caused by slow oxidation of pyrite) with the resulting slow leach of Th-230, Ra-226 and Pb-210 and some other radionuclides into the run-off. Presently, uranium mills treat the small amount (~1–5%) of the Ra-226 solubilized during leaching with barium chloride to precipitate a radium-barium sulphate which is stored in a separate tailings area. This latter precipitate can be broken down by bacteria leading to the additional problem of barium in any seepage water from the disposal area.

With the ore grades in many areas decreasing, and with more stringent requirements for environmental protection with respect to radionuclides in force, the technology as presently practiced at many locations will require basic modifications in order to meet such constraints.

Some reports have appeared on tests with HCl or chloride leaching of uranium. R. A. Ewing et al (Battelle Mem. Inst. Columbus, Ohio, Progress Rpts. Oct. 15, 1952, through to Oct. 20, 1954) tested the dissolution of carnotite and certain other U ores in HCl-acidified ethanol, -methanol and -acetone, obtaining U extractions of above 90% with HCl-methanol. In a pilot plant, U extractions of 95-98% were recorded. The use of $KClO_3$ as an oxidizing agent was mentioned. No mention was made of the fate of thorium or radium-226. A recent attempt to verify these results on conventional Canadian Elliot Lake ores was unsuccessful (Ritcey et al).

U.S. Pat. No. 2,894,804, July 14, 1959, C. W. Sawyer et al describes extraction of uranium and radium from some uranium ores by treating with ferric chloride solution at temperatures above 50° C. and pH less than 4. The leach solutions were treated with $CaCO_3$ (pH~5) to precipitate iron, with $BaCO_3$ (pH~6) to precipitate uranium, and $H_2SO_4$ to precipitate radium. HCl was not tested in the Examples, nor was the fate of thorium followed.

W. A. Meerson et al (Izv. Akad. Nauk. SSSR Metal, I, 42, Jan.-Feb. 1967) extracted thorium and the rare earths from monazite sands using HCl solution after treating the sands with sodium hydroxide.

Some tests have been reported on high temperature chlorination of uranium minerals followed by extraction and recovery of uranium or certain other metals. R. Lepage et al (Trans. I.M.M., C 82, C101-102, June 1973) passed $CCl_4$ over samples of Elliot Lake uranium ore between 600°–900° C. with maximum subsequent extraction and recovery of U reported to be 96% at 800° C. Using instead $Cl_2$ the recoveries were 91% at 800° C. and 78% at 600° C. G. R. Lachance tested $CCl_4$ as a chlorinating agent for Canadian Beaverlodge ore (Eldorado Mining & Ref. Ltd., Rpt. T60-24, 1960). Amounts of U, Fe, silica, etc. (but not Th or Ra) were determined in the volatilized portion, in the residue, and in the calcine wash. Extractions of U varied between 11 and 98% depending on temperature, time, and $CCl_4$- and $N_2$-flow rates.

R. Cable et al (Met. and Chem. Eng. XVIII (9), 460-2, 1918) mention the recovery of radium, believing that radium in a pitchblende ore was converted to a volatile chloride by chlorination at high temperature. On washing the condensed chlorides apparently about 93% of the initial radium in this particular ore was recovered by coprecipitation with barium sulfate.

I. Adamskii et al (Nukleonica V(11), 761-769, 1960) investigated the chlorination of certain carboniferous sandstone and granite ores as well as wash containing 0.11% U, with extraction and recovery of U varying between 88 and 95%. Thorium or radium behaviour was not explored. Chattanooga shale has been chlorinated at 600°–1000° C. but the effect on Th or Ra was not determined (H. B. Rhodes et al, U.S. Pat. No. 2,890,099, 1959, and F. Z. Pollara et al, U.S. A.E.C. Rpt. RMO-4015, 1960).

G. Jangg et al (Atompraxis 7, 332-336, 1961) studied reactions between uranium oxides and $Cl_2$, C, HCl, $CH_4$, $CCl_4$ and $COCl_2$ and showed that the formation of $UCl_4$ was not favored in the absence of the specified reducing agent. With a 2.5 times excess of $CCl_4$, or $Cl_2$— plus —$CH_4$, 90% of the U was distilled as chloride at 600° C. Thorium and Ra were not studied.

Japanese workers (Japan Pat. No. 1964-3015, Feb. 17, 1965; T. Suzuki et al, Tokyo Kogyo Shikensho Hokoku 63, 51-62, and 75-81, Feb. 1968; S. Ino et al, Kogyo Kagako Zasshi 68, 2360-6, Dec. 1965) treated a low grade U ore with mixtures of $Cl_2$, CO and $CO_2$, vaporizing about 80% of the uranium as chloride. Most of the $Cl_2$ reacted with gangue material producing a raw condensate containing only about 4% uranium chloride without fractional distillation.

O. M. Hilal et al (Ind. Eng. Chem. 53, (12), 997-8, 1961) chlorinated monazite sands containing rare earths in a tube furnace at 900°–850° C. containing powdered charcoal. By maintaining a thorium collection zone above 475° C., $ThCl_4$ was deposited free of more volatile chlorides of U, Fe and P which condensed below 475° C. Rare earth chlorides remained with the calcine.

In studying analysis of ores and yellowcakes for rare earths, involving chlorination at 950° C. and volatilization of impurities such as Th, Fe, etc., J. B. Zimmerman et al (Anal. Chem. 32, (2), 243,1960) found that careful dehydration of the charge was necessary to prevent the formation of non-volatile refractory oxychlorides of thorium.

Thus little has been found in the literature on the direct HCl-leaching of uranium ores, and the extraction and recovery of thorium and uranium has not been described in this context. Initial chlorination of uranium-bearing materials has been described usually at temperatures well above 600° C. One reference found that radium chlorides had volatilized from a pitchblende ore but we have not been able to repeat this work on conventional uranium ores. No feasible integrated process for the concurrent recovery of thorium and radium as well as uranium, has evidently been reported.

SUMMARY OF THE INVENTION

We have developed a complete method of recovering separately uranium, thorium, and radium, from impure solids comprising ores, concentrates, calcines or tailings containing these metals, comprising:
  (1) leaching in at least one stage, said impure solids in finely divided form, with aqueous leachant containing at least one of HCl and $Cl_2$, until acceptable amounts of the uranium, thorium and radium are dissolved;
  (2) separating the aqueous leach solution from the solid residue and disposing of the residue;
  (3) recovering uranium from the solution by solvent extraction and precipitation steps;
  (4) if present in sufficient amounts, recovering thorium from the solution by solvent extraction and precipitation;
  (5) recovering radium from the solution by at least one of ion exchange, adsorption, and precipitation, and disposing of the radium;
  (6) controlling the amount of iron in the solution to avoid any iron build-up therein; and
  (7) recycling this barren acid solution to step (1).

In many cases (depending on the nature of the feed) we have found it desirable to subject the starting material (usually an ore) to a two-stage roast (to form a calcine) in the presence of both chlorine and reducing agent comprising metal sulfide; the first stage at about 350°–450° C. volatilizing chlorides of part of the uranium and iron if present, the second stage at about 550°–700° C. chlorinating radium and thorium, and volatilizing chlorides of any residual iron, to give said calcine. Desirably the chlorides, volatilized from the calcine, are condensed and leached as in step (1) to recover uranium and thorium. Preferably pyrite is present or added to act as reducing agent and iron is recovered from the volatile chloride fraction.

It has been found that, for many starting materials, leach conditions yielding high extractions of radium do not coincide with conditions yielding high extractions of Th or U. Leaching with two or more stages, where in each stage conditions are selected for high recoveries of one or two of the metals, has been found desirable in most cases.

DETAILED DESCRIPTION

Figure 1:
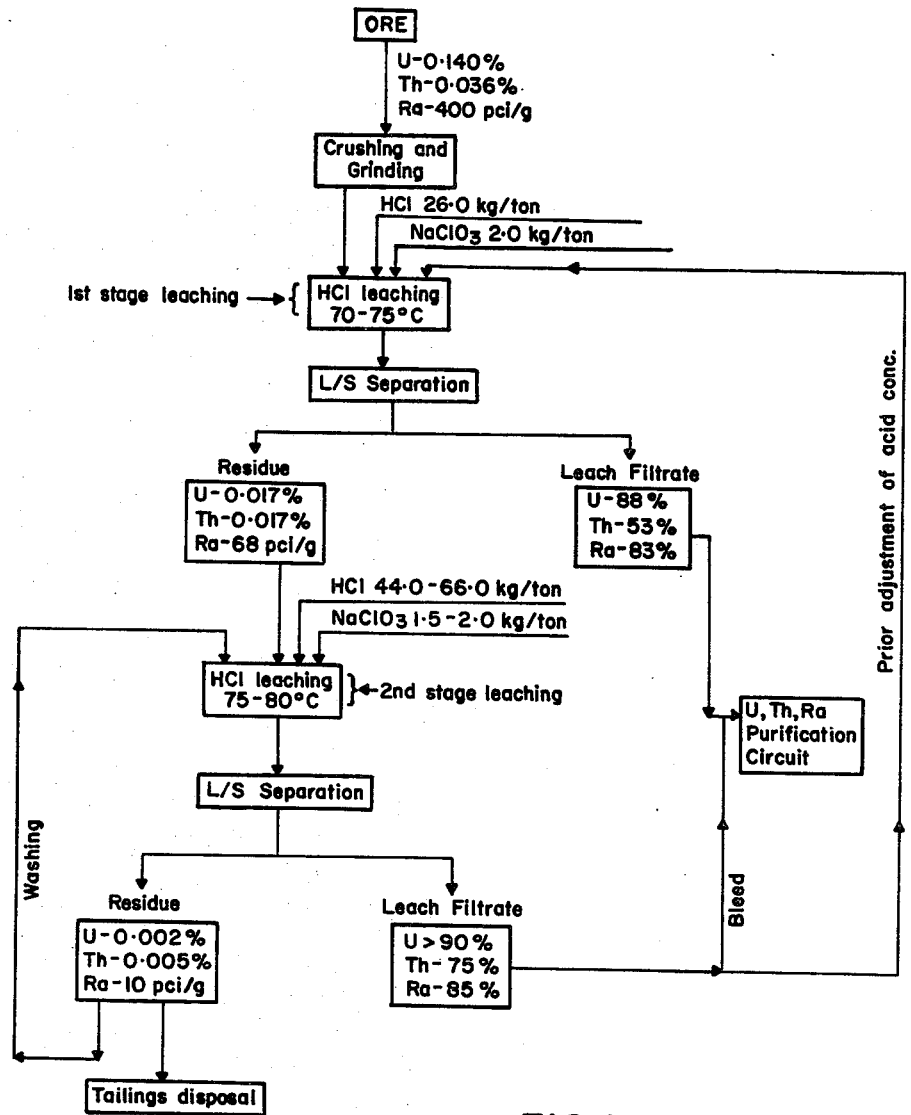
FIG. 1 is a flowsheet for a two-stage leach using HCl on a uranium ore.

The feed material can be any impure solids containing uranium, thorium and radium such as ores, concentrates, calcines or tailings or mixtures thereof. For leaching, the solids should be in finely divided form usually about 40 to 60%-200 mesh or finer. For the roast step, the particle size may be somewhat coarser, e.g. 100%-48 mesh but finer than this is preferable.

For the direct leaching of the finely divided solids (no roast step), the leachants can be selected from aqueous HCl, aqueous $Cl_2$ and mixtures thereof. The concentrations of HCl or $Cl_2$ can vary widely depending on the nature of the solids, temperature, time and other conditions. Leaching has been carried out with from about 10 to about 90 kg HCl per tonne of solids, with from about 35–45 usually considered preferable. For leachant chlorine, the concentration will preferably be about 15 to 35 kg $Cl_2$/tonne.

Oxidizing conditions have been found preferable to facilitate direct leaching of U, Th and Ra (in the absence of roast). These conditions can be provided by the addition of an oxidizing agent such as sodium chlorate, chlorine dioxide, and hydrogen peroxide, or by passing air, oxygen or ozone through the liquid. Where $Cl_2$ is used as leachant, no additional oxidizing agent has been found necessary, but mixtures such as chlorine and chlorine dioxide could be used. The amount of oxidant used will depend on many factors but will usually be within about 0.5 to about 20 Kg $NaClO_3$/tonne or the equivalent in other oxidants. The higher part of this range would be more suitable for a first or single stage leach, with the lower part of the range being used for a second or additional leach stage.

For the leaching, the slurry solids content will most suitably be about 50–60%, however this is not critical. During leaching, the temperature is suitably about 65°–75° C. but temperatures outside of this range have been used satisfactorily, e.g. ambient to 90° C.

Leaching time will depend on the nature of the ore and particle size, the severity of leach conditions, etc., within about 4–18 hrs. usually being appropriate. The second stage of a two-stage leach might require 4–8 hrs.

When leaching is substantially completed, the solids will be separated by any convenient method, washed as necessary, and disposed of. The process will normally be operated so that the radionuclide content measured as Ra-226 will be below about 25 pCi/g with the solids being suitable for disposal as back-fill or surface land-fill amenable to revegetation.

We have found that the optimum leaching conditions for Th (or U+Th) do not correspond with the optimum for Ra (or U+Ra) so that direct leaching in two or more stages has been found to be preferable. The conditions in at least one stage would be selected for high U or Th+U recoveries and in the other(s) for high Ra or U+Ra recoveries. Direct leaching in two stages is illustrated in Examples 1, 2 and 4. Cl$_2$-assisted leaching favors the release of Th and U with recoveries being realized of U 98% and Th 92%.

Hydrochloric acid leaching in absence of oxidant favors the extraction of uranium and radium (e.g. U—97%, Th—75% and Ra—89% with 55.0 kg HCl/tonne at 75° C. for 18 hours agitation). Similarly hydrochloric acid leachings in presence of molecular oxygen (i.e. air or oxygen) favor uranium and radium extractions provided the acid concentration does not exceed about 44.0 kg HCl/tonne (e.g. U—94%, Th—56% and Ra—92% with 35.0 kg HCl/tonne). However, when this acid concentration was above 44.0 kg HCl/tonne these leachings were more effective to extract uranium and thorium rather than radium (e.g. U—98%, Th—78% and Ra—62% with 88.0 kg HCl/tonne).

Conditions for optimum extraction of uranium, thorium and radium by hydrochloric acid leaching in presence of sodium chlorate have been determined. Results obtained from various leaching conditions lead to the conclusion that uranium—96%, thorium—81% and radium—91% could be extracted in a single stage leaching with a mixture of 44.0 kg HCl and the equivalent of 2.5 Kg NaClO$_3$ per tonne of ore at 75° C. during 18 hours of agitation.

Uranium recovery from the leach solutions can be achieved by selected solvent extraction, ion exchange or precipitation techniques, e.g. a combination of solvent extraction using a selected tertiary amine, followed by stripping with either acid or base, and precipitation as the appropriate diuranate. More detail on suitable U recovery techniques is given in "Solvent Extraction: Principles and Applications to Process Metallurgy" Part II, G. M. Ritcey et al, Elsevier 1979, pages 452–522.

Thorium can be removed from the leach solution by solvent extraction, ion exchange or precipitation; e.g. with solvent extraction using a selected primary amine or an alkylphosphate, stripping with a suitable acid, e.g. HCl, and precipitation and recovery as a salt such as the chloride, nitrate, sulfate, carbonate, or as the oxide.

Radium can be recovered from the solutions by precipitation, or by cation exchange resins with elution from the resin and precipitation from the eluate, or by adsorption on a selected porous adsorbent. The resins or adsorbents can be loaded to saturation or full capacity and disposed of as such. Alternatively the radium can be recovered from solution by precipitation as a radium barium sulfate which can be disposed of. If the other desired values have been removed first, the remaining solution containing radium could be evaporated to dryness and the residue disposed of (by techniques known to the nuclear industry).

In cases where iron builds up in the leach solution, it can be removed by precipitation using pH adjustment, solvent extraction or ion exchange techniques, leaving an acid solution suitable for recycle to form leachant.

Figure 5:
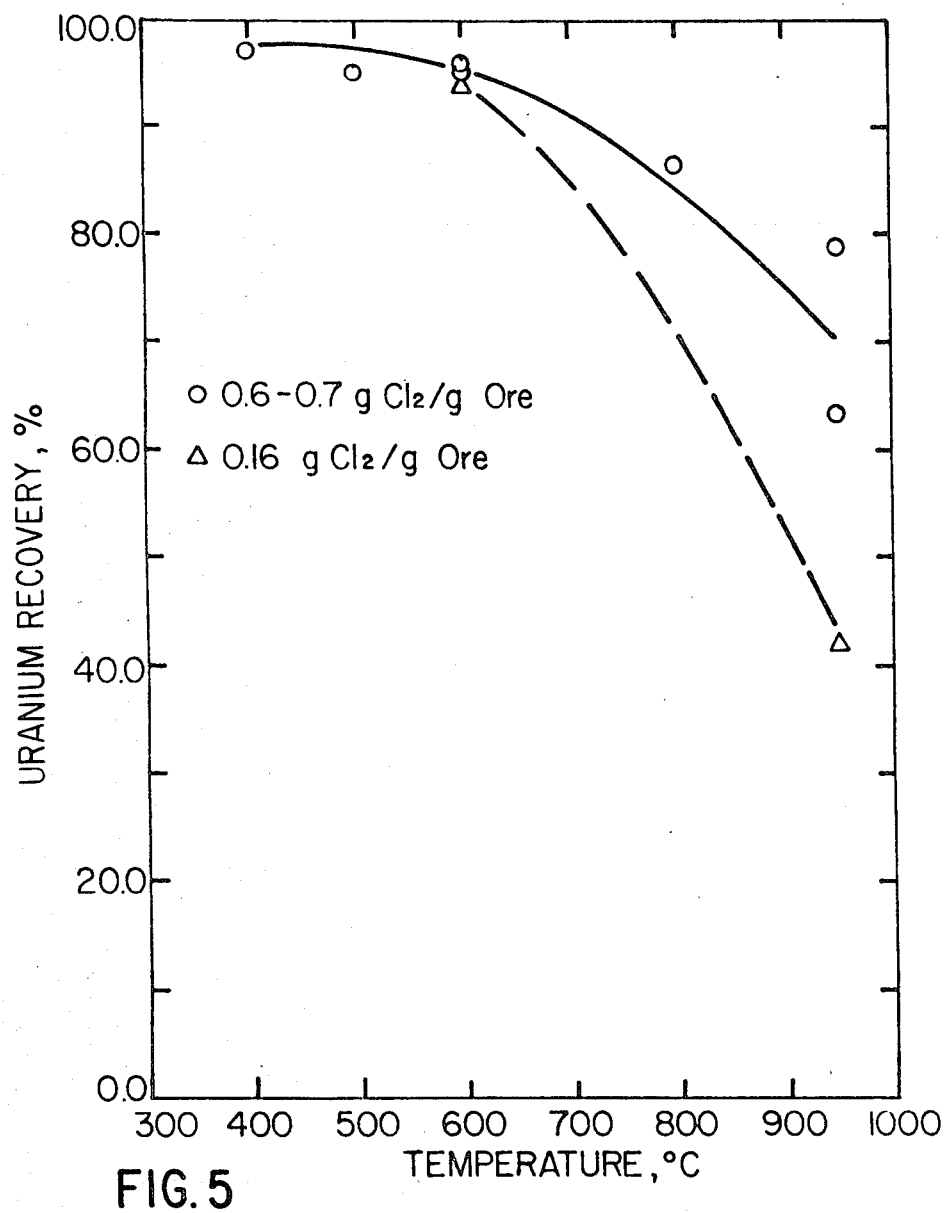
FIG. 5 is a graph showing the ultimate % uranium recovery vs. chlorination roast temperature at two levels of chlorine concentration during the initial roast.
Figure 6:
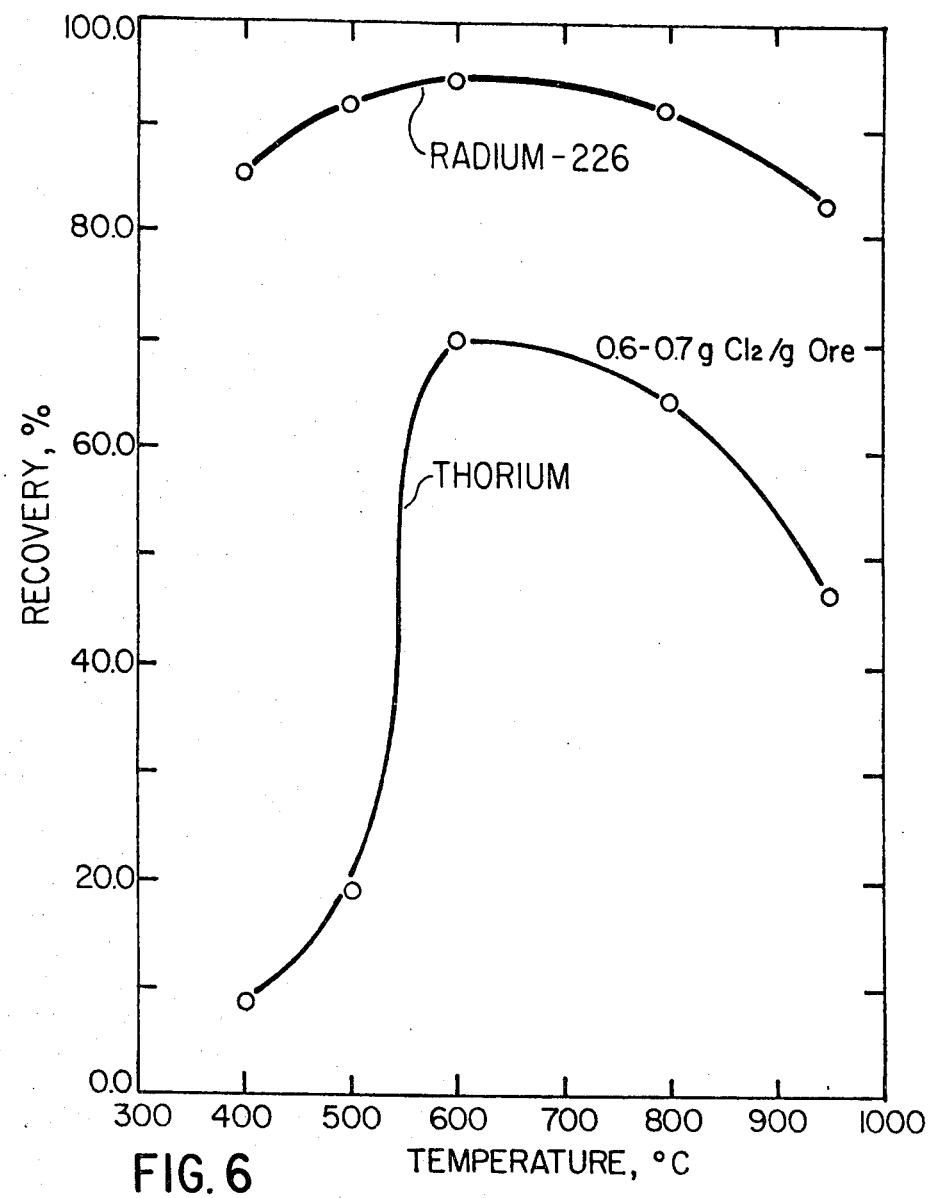
FIG. 6 is a graph showing the ultimate % recovery of radium and thorium vs. chlorination roast temperature at the same $Cl_2$ concentration level. For FIGS. 5 and 6 the % recoveries were totals calculated for a single 1 hour dilute HCl leach of the calcine, and including values from a water leach of the condensates.

Dissolution of the ore, concentrate or tailings can be facilitated by conducting a chlorination roast controlled to chlorinate U, Th and Ra, as well as pyrites, other sulfides, arsenides and any other chlorinateable metals, but not silica, alumina or potassium oxides. In order to chlorinate the U, Th and Ra and yet retain the reaction products in readily leachable form, it has been found necessary to control the temperature in two stages, at (1) about 350°–450° C. to chlorinate uranium and (2) about 550°–700° C. to chlorinate Th and Ra. At temperatures of about 700° C. and above, the leachability and recovery of all three metals was decreasing (see FIGS. 5 and 6). It is preferred to control these stages at close to 400° C. and 600° C. respectively. The uranium that volatilizes below 600° C. will not be subject to the higher temperatures in the calcine and will be in a readily recoverable form.

Chlorination will be substantially complete within about 0.1 to 1 hr. retention time in the roast step. Results have shown little change between 0.5 hr and 1 hr retention times.

Sufficient chlorine should be provided during the roast to chlorinate the U, Th and Ra. Usually an excess of chlorine will be passed through and recycled. The chlorine can be provided from a sulfur chloride (e.g. SCl$_2$ or S$_2$Cl$_2$) or other readily decomposed chloride instead of or in addition to chlorine gas. Chlorine flow-rates of between about 0.15 to about 0.8 g Cl$_2$/g ore have been used but these are not critical.

The presence of a reducing agent will normally be required during the roasting. The reducing agent should be able to reduce oxides of uranium, radium and thorium during the specified roasting step. We have found that reducing agents comprising metal sulfides are much preferred in our process. Sulfides of metals such as iron, zinc, lead or copper would act as reducing agents in this context. Also arsenides of nickel, cobalt, iron, etc., if present, would contribute to this reducing action at the roasting temperatures. The presence of pyrite has been found particularly beneficial for this purpose with the iron easily recovered. The addition or recycle of sulfur chlorides to the roast step has been found similarly beneficial in providing both chlorine and reducing capacity. A stoichiometric excess of reducing agent will normally be provided in the form of excess metal sulfide or sulfur chloride. At least about 2% by wt. of the starting solids should be metal sulfide reducing agent.

The roasting step will provide a solid calcine containing chlorides of radium, thorium and some uranium, and condensed volatilized chlorides comprising some uranium and iron (or other reducing sulfide metal). The calcine is leached with a chloride leachant to solubilize chlorides of radium, thorium and uranium. The residual calcine will be very low in radionuclides (usually less than about 20 pCi Ra-226 per g) and suitable for disposal. The radium is isolated from the calcine leach solution as discussed above. At least part of the U and Th values remaining in the solution can be isolated and combined with the chlorides from the condensate, with the residual leach liquor recycled. Alternatively, part of the leach solution containing U and Th could be fed to a secondary leach of the condensate solids (and the other part recycled). Combined leached U and Th values from both calcine and condensate will be subject to U and Th purification (see FIG. 4) as discussed above. Iron build-up will be controlled in the remaining leach liquor and the leach liquor recycled. The leachants for the calcine and the condensate fractions will be selected for optimum recoveries of U, Th and Ra from each.

Where sulfur is present in the starting solids, the chlorination roast will volatilize some sulfur chlorides, e.g. S$_2$Cl$_2$ and these chlorides are very suitable for use in forming leachant as well as for recycle to the roast step.

Due to the small amounts of thorium present in some ores (e.g. as in Examples 7 and 8) it may not be necessary or desirable to recover thorium in such cases. Should thorium fuels become more in demand, it may become desirable to recover even small amounts of thorium. Thus where thorium contents are low, thorium recovery is optional according to this invention.

Some typical test runs are given in the following Examples.

EXAMPLE 1

A sample of uranium ore from Elliot Lake, Ontario, contained about 0.1% U, 0.04% Th, Ra-226 355 pCi/g, 3% Fe and 3% S. The sample was ground to about 50%-200 mesh and subjected to an HCl leach with no oxidant added. The leach conditions were:

1000 g charge
26 Kg/tonne HCl
aqueous leach slurry 58% solids
temperature 50° C.
time 24 hours
no oxidant added.

The percent U, Th and Ra extracted into the leach liquor were calculated from analysis to be:

U=67%
Th=45%
Ra=66%.

The solids from this first stage were then given a second stage extraction under the following conditions:

500 g charge
35 Kg/tonne HCl
aqueous leach slurry 50% solids
temperature 80 ° C.
time 6 hours.

The total % extracted were found to be:

U=95%
Th=81%.

In the residue, the level of Ra=24 pCi/g, which is a substantial drop from levels in many current tailings (300 or more pCi/g). The U, Th and Ra can be recovered from the leach liquor as described above. The flowsheet would be similar to that in FIG. 1 (see also Example 4).

EXAMPLE 2

The same ore as in Example 1 was ground and leached with HCl under the following conditions:

1000 g charge (ground to 50%-200 mesh)
44 kg HCl/tonne added
aqueous leach slurry 50% solids
temperature 75° C.
time 20 hours After separating the leach liquor and washing, analyses were run and the % extracted calculated to be:

U=97%
Th=81%
Ra=85%.

The solids from this first stage were extracted a second time under the following conditions:

500 g charge
6 L $Cl_2$ bubbled
aqueous leach slurry 50% solids
temperature 75° C.
time 6 hours.

Figure 2:
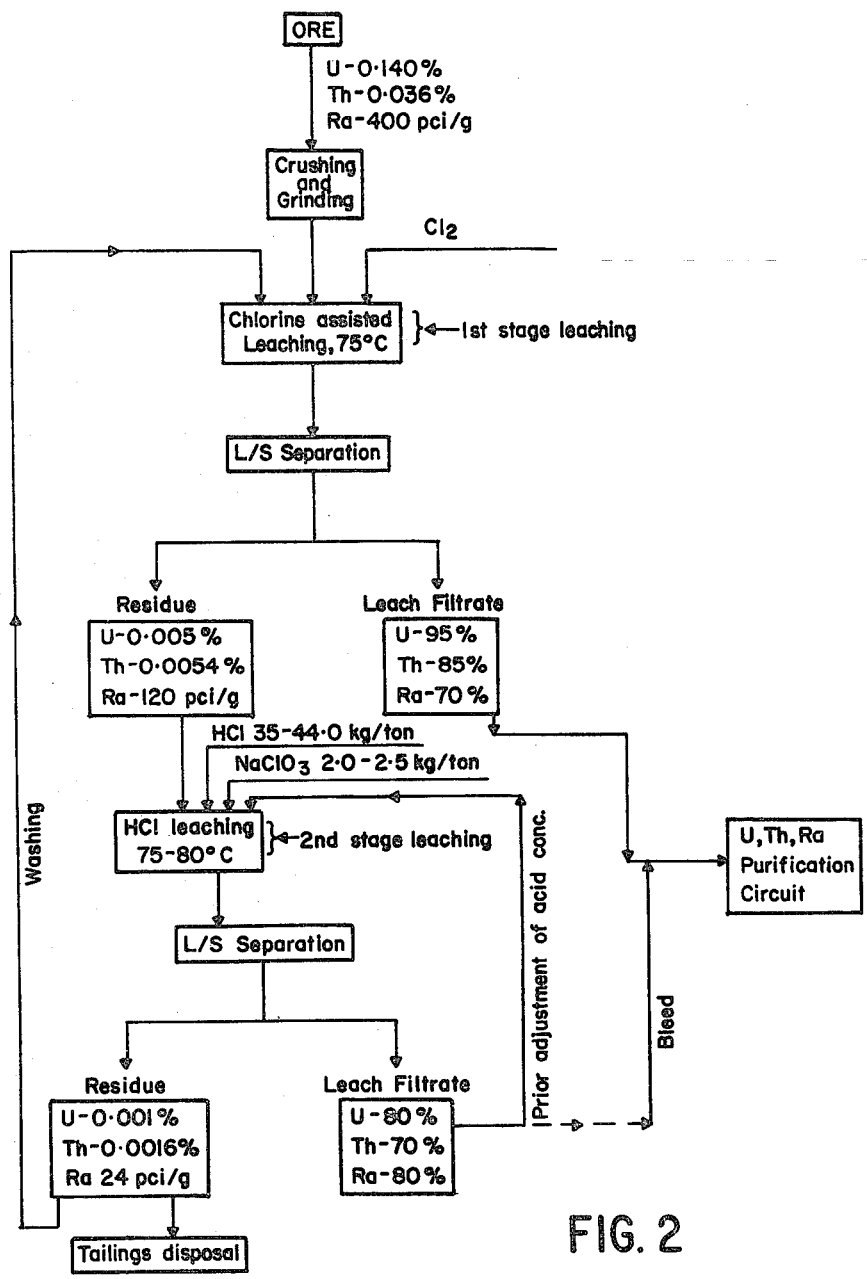
FIG. 2 is a flowsheet for a two-stage leach using $Cl_2$, followed by HCl on a uranium ore.
Figure 3:
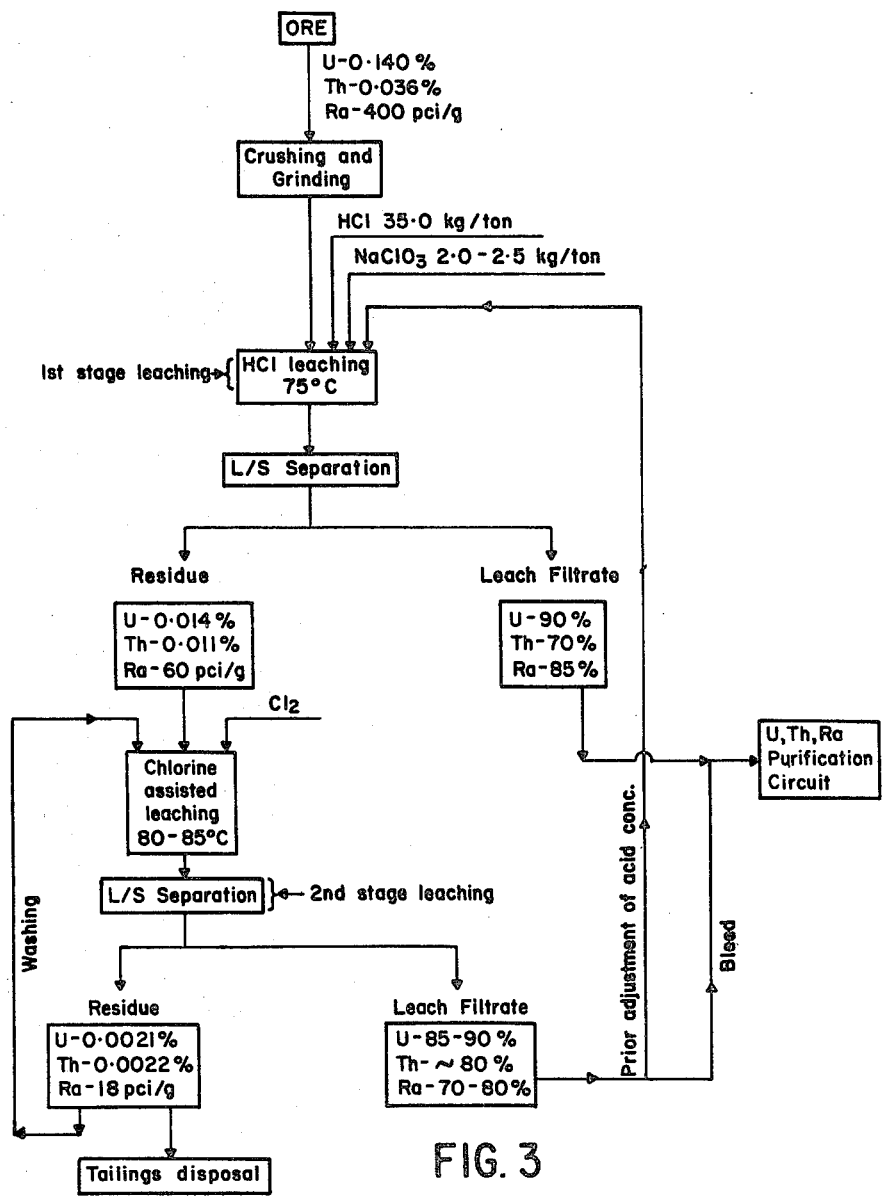
FIG. 3 is a flowsheet where the stages are in the reverse order from FIG. 2.

After this second extraction the total % extracted were:

U=98%
Th=81% and the radium in the residue was down to Ra=25 pCi/g. Thus chlorine gas can be used to form an effective leachant, with no additional oxidant required. As in the flowsheets of FIGS. 2 and 3, a $Cl_2$ leach step can be coupled very effectively with an HCl leach step.

EXAMPLE 3

The same ore as in Example 1 was ground and leached with HCl under oxidizing conditions as follows:

1000 g charge (ground to 50%-200 mesh)
88 Kg/tonne HCl added
aqueous leach slurry 50% solids
temperature 80° C.
time 24 hours.
Air bubbled through slurry.

After separating the leach liquor and washing from residual solids, analyses showed the % extracted to be U=95%
Th=90%
Ra=87%.

These single stage extractions may be high enough for some circumstances. The residue would contain about 35 pCi (Ra-226) per g.

EXAMPLE 4

The same ore as in Example 1 was ground and leached with HCl plus oxidant under the following conditions:

1000 g charge (ground to 50%-200 mesh)
44 Kg/tonne HCl plus 2.5 Kg/tonne $NaClO_3$ added
aqueous leach slurry 50% solids
temperature 75° C.
time 18 hours.

After separation of leach liquor and washings, analyses showed the % extracted to be:

U=96%
Th=87%
Ra=91%.

The residual solids were again extracted as follows:

500 g charge of 50%-200 mesh
44 Kg/tonne HCl plus 0.5 Kg/tonne $NaClO_3$
aqueous leach slurry 50% solids
temperature 80° C.
time 6 hours.

The leach liquor and washings were separated from the solids and % extractions found to be:

U=98%
Th=87%
Ra=15 pCi/g in the residue.

This Example is similar to the flowsheet of FIG. 1. Further tests similar to these Examples have indicated suitable concentration ranges for leach reagents and temperatures as shown in flowsheets FIGS. 1-3. A process similar to FIG. 1 has given the lowest residual radium in the solid tailings.

EXAMPLE 5

A sample of Elliot Lake, Ontario, ore as in Example 1 was ground to about 60%-200 mesh and subjected to an initial chlorination roast in a silica tube furnace. The charge was held in porcelain boats in pairs in the reaction tube and chlorine gas passed through the tube. Condensate was collected in the hot tube just beyond the heated furnace zone and also in a room temperature collecting vessel. Nitrogen was passed through the tube while the temperature was being raised, and as soon as the desired temperature was reached, chlorine and carbon monoxide at 10:1 ratio were substituted. After the desired chlorination time had elapsed, the nitrogen flow was resumed while the furnace cooled. The residual calcine, and both high and low temperature condensates were collected. A series of tests was run at different temperatures.

The calcine in each case was leached with 0.05 M HCl at a slurry solids content of 10%, at 80° C. for 1 hour. The condensates were combined and leached with water. Leach conditions could be more severe if necessary. The total leached values were combined to give % recovery of uranium, thorium and radium. The flowsheet was similar to that of FIG. 4. Typical results are summarized in FIGS. 5 and 6. Results have shown that the radium can be chlorinated in 1 hour at about 550°–600° C. but the chloride stays with the calcine residue and can be leached with the HCl or $Cl_2$ leachant. A maximum Ra recovery of 95% was attained for a roast temperature of 600° C. and $Cl_2$ throughput varying from 0.15 to 0.7 g $Cl_2$/g ore. Similarly thorium was found to be chlorinated at about 550°–600° C. but the % recovery of Th decreased above about 600° C. From the preceding examples it is evident that the % recovery of Th could be increased by using more severe chlorination-leach conditions. High uranium recoveries were attained in the 400°–600° C. range with recoveries decreasing above this range. The iron and major amounts of uranium volatilized as chlorides and were recovered from the condensate.

The highest U extraction (98%) occurred at about 400° C. with a 1 hour retention time and a chlorine throughput of 0.6–0.7 g $Cl_2$/g ore, and decreased to about 72% at 950° C. A decrease in $Cl_2$ throughput to 0.16 g $Cl_2$/g had little effect at 600° C. but at 950° C. reduced U recovery to about 42%.

The % $Cl_2$ utilization was calculated to vary from a high of approximately 70% at 0.16 g $Cl_2$/g to a low of approximately 20% at 0.65 g $Cl_2$/g ore. Unused $Cl_2$ would be recycled.

Typical HCl leach liquor concentrations (including volatiles, Elliot Lake ore) were:
U—0.01–0.10 g/L
Th—0.003–0.03 g/L
Ra-226—15,000–35,000 pCi/L
Ca—0.01–0.03 g/L
Al—0.01–0.07 g/L
Fe—0.03–0.07 g/L

EXAMPLE 6

Data of the type in Example 5 indicated that the optimum roast temperature for maximum uranium recovery is about 400° C. while for maximum radium recovery about 600° C. is required. Hence a two-stage roast first at 400° C. (allowing for volatilization of U chlorides), then at 600° C. is preferred. A two-stage vertical shaft furnace was designed. The hollow shaft was heated with two 30 cm long furnaces placed in tandem and controlled so that the upper maintained a temperature of 400° C. at its midpoint, while the lower similarly maintained 600° C. The same ore as in Example 1 was fed at the top of the shaft and discharged at the base. Chlorine was fed into the shaft near the base.

In the continuous operation of the shaft furnace, uranium ore containing 0.12% U and 395 pCi Ra-226/g was chlorinated with a retention time of approximately 20 min., and 1330 g of calcine were produced in the period of 1¾ hr. Agitating a 125 g sample of the calcine in 0.05 M HCl at 80° C. for 1 hr yielded a residue containing 0.0029% U which corresponds to a uranium extraction of 97.6% and also containing 20 pCi Ra-226/g which corresponds to a radium-226 extraction of 94.9%.

The HCl leach liquor typically contained
U—0.05 g/L
Fe—0.3 g/L
Ra-226—30,000–50,000 pCi/L.

EXAMPLE 7

A chlorination roast followed by a chloride leach of the calcine, and dissolution of the volatilized chlorides, was carried out on a different ore from the northern region of Saskatchewan. This complex ore is higher in U and Ra; lower in Th and contains in addition Ni and As, compared to Elliot Lake ore.

A preliminary test using a two stage roast at 400° C. and then 600° C., followed by a single stage HCl leach gave approximate recoveries as follows:
U=89%
Ra-226=89%
Ni=87%
As=64%.

These values could be improved by optimization of conditions.

Figure 4:
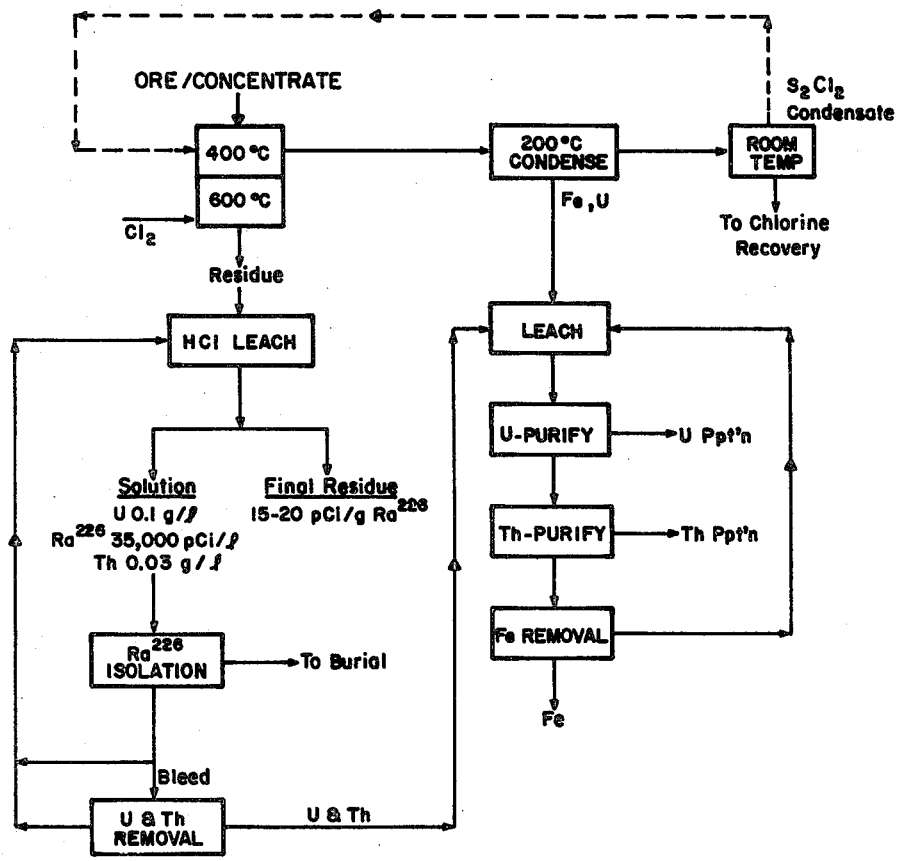
FIG. 4 is a flowsheet where an initial two-stage chlorination roast yields a calcine and a concentrate both of which are leached.

It would be advantageous to recover chlorine from volatilized sulfur chlorides (and arsenic chlorides) and recycle the sulfur (and arsenic) as reducing agent, and also the chlorine, to the roast stage, as indicated in dotted line at the top of FIG. 4.

EXAMPLE 8

A similar ore sample from Saskatchewan as in Example 7 was ground to 50%-200 mesh, formed into an aqueous slurry of 50% solids content and subjected to a chlorine-assisted leach under the following conditions:
25 m³ $Cl_2$ passed/tonne ore
temperature 60° C.
time 6 hours.

The leached solids were separated, washed and the leach and wash liquors analyzed for uranium and radium. The percent extractions were uranium 98% and radium 96%. Due to the low thorium content of this ore, the thorium extraction was not determined.

We claim:
1. A method of recovering separately uranium, thorium, and radium, from solids comprising ores, concentrates, calcines or tailings containing these metals, comprising:
   (1) leaching in at least one stage, said U, Th and Ra-bearing solids in finely divided form with aqueous acidic leachant containing at least one of HCl and $Cl_2$, the leach conditions and stages being selected to cause high proportions of the uranium, thorium and radium to be dissolved;
   (2) separating the aqueous leach solution from the solid residue and disposing of the residue;
   (3) recovering uranium from the solution by solvent extraciton and precipitation steps;
   (4) when economic, recovering thorium from the solution by solvent extraction and precipitation;
   (5) recovering radium from the solution by at least one of ion exchange, adsorption, and precipitation, and disposing of the radium;
   (6) when iron is present in the leach solution controlling the amount of iron in the solution to avoid any iron build-up therein, and
   (7) recycling the resulting depleted chloride solution to step (1).
2. The method of claim 1 wherein said solids in step (1) comprise a chlorination calcine containing radium chloride obtained from a two-stage roast of a uranium ore or concentrate in the presence of both chlorine and reducing agent comprising metal sulfide; the first stage at about 350°–450° C. volatilizing chlorides of part of the uranium and iron if present, the second stage at about 550°–700° C. chlorinating radium and thorium, and volatilizing chlorides of any residual iron, to give said calcine.

3. The method of claim 2 wherein the chlorides, volatilized from the calcine, are condensed and leached to recover uranium.

4. The method of claim 2 wherein said reducing agent includes pyrite and iron is recovered from the volatile chlorides.

5. The method of claim 2 wherein said solids or reducing agent includes sulfur, with $S_2Cl_2$ being recovered from the volatiles and recycled to roast or leachant.

6. The method of claim 1 wherein step (1) is a two-stage leach, one stage being adapted to optimize radium recovery and the other stage adapted to optimize thorium or uranium recovery.

7. The method of claim 1 wherein step (1) is at least a two-stage leach, the leachant in at least one stage including HCl plus an oxidant.

8. The method of claim 6 wherein in both leach stages the leachant includes HCl plus an oxidant.

9. The method of claim 6 wherein the aqueous leachant comprises dissolved $Cl_2$ in one stage.

10. The method of claim 7 wherein the concentration of HCl is within the approximate range of 10 to 90 kg/tonne for a uranium ore feed.

11. The method of claim 9 wherein the concentration of $Cl_2$ utilized is within the approximate range of 15 to 35 kg of $Cl_2$ per tonne for a uranium ore feed.

12. The method of claim 7 wherein the oxidant is selected from the group consisting of alkali metal chlorates, chlorine dioxide, air, oxygen, peroxide and ozone.

13. The method of claim 12 wherein the concentration of oxidant is equivalent to the approximate range for $NaClO_3$ of 0.4 to 20 kg/tonne of a uranium ore feed.

14. The method of claim 1 wherein the thorium is recovered in step (4) by solvent extraction into an organic phase containing a primary amine extractant, the thorium stripped with hydrochloric acid and recovered as thorium chloride or oxide.

15. The method of claim 1 wherein the radium is recovered by loading onto a solid ion exchange resin or solid adsorbent to substantial saturation, and the loaded solid disposed of.

16. The method of claim 1 wherein the leaching steps and leaching conditions have been selected to leave in step (2) a solid residue containing less than about 25 picocuries (Ra-226) per g.

17. The method of claim 2 wherein said uranium ore or concentrate contains arsenic, arsenic chloride being volatilized during the heating for the first roast stage, condensed, and the arsenic recovered.

* * * * *